Jan. 30, 1934.  G. H. LELAND  1,945,503
SWITCH OPERATING MECHANISM FOR ELECTRIC MOTORS
Filed March 31, 1932  2 Sheets-Sheet 2
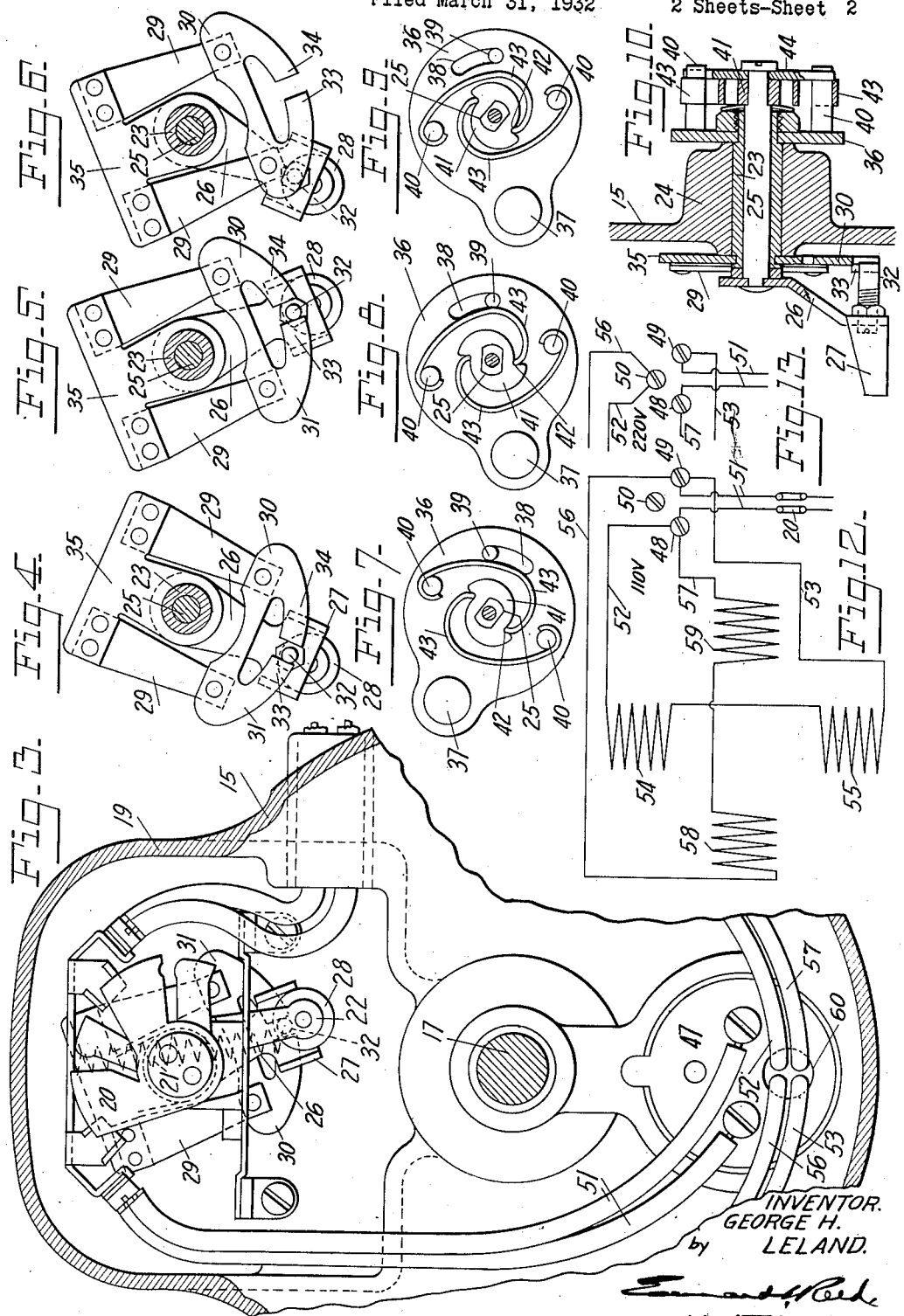
INVENTOR.
GEORGE H. LELAND.
by
his ATTORNEY.

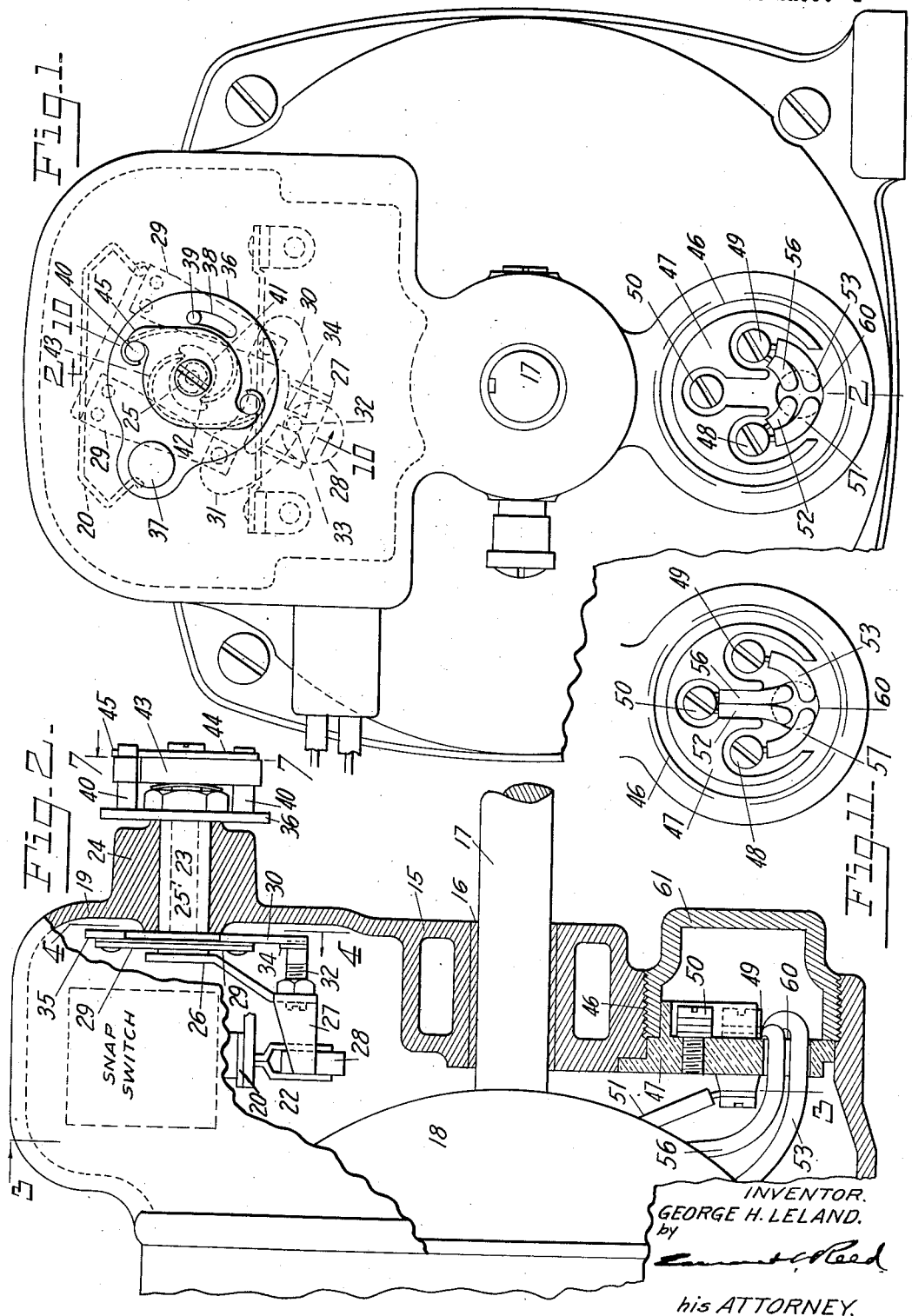

Patented Jan. 30, 1934

1,945,503

UNITED STATES PATENT OFFICE 1,945,503

SWITCH OPERATING MECHANISM FOR ELECTRIC MOTORS

George H. Leland, Dayton, Ohio, assignor of one-half to The Leland Electric Company, Dayton, Ohio, a corporation of Ohio Application March 31, 1932. Serial No. 602,217

24 Claims. (Cl. 200—138)

This invention relates primarily to switch operating mechanism for electric motors and is in the nature of an improvement upon the mechanism shown and described in the application for patent filed by me November 16, 1931, Serial No. 575,323.

One object of the invention is to provide a switch operating mechanism having temperature controlled means for automatically opening the switch when an abnormal temperature occurs within the motor casing and in which the temperature controlled means will be so mounted and arranged within the casing that it will not be materially influenced by temperature conditions outside the casing or by the temperature of the casing itself.

A further object of the invention is to provide switch operating mechanism in which the switch will be automatically opened under abnormal temperature conditions by the action of a spring device which will exert an increasing force thereon as it moves from one position to another.

A further object of the invention is to provide such a mechanism which will be simple in its construction and operation and which will be inexpensive to construct.

Other objects of the invention will appear as the mechanism is described in detail.

In the accompanying drawings Fig. 1 is an end elevation, partly broken away, of a motor embodying my invention; Fig. 2 is a section taken on the line 2—2 of Fig. 1, showing the motor casing partly in elevation; Fig. 3 is a section taken on the line 3—3 of Fig. 2; Figs. 4, 5 and 6 are sections taken on the line 4—4 of Fig. 2, showing the temperature controlled actuating device in different positions; Figs. 7, 8 and 9 are sections taken on the line 7—7 of Fig. 2, showing the spring device which imparts movement to the switch actuating device in positions which it occupies when the switch actuating device is in the positions shown in Figs. 4, 5 and 6, respectively; Fig. 10 is a section taken on the line 10—10 of Fig. 1; Fig. 11 is a detail view of the device for adjusting the connections between the field windings and the switch; Fig. 12 is a circuit diagram showing the connections between the windings and the switch adjusted for 110 volt current; and Fig. 13 is a diagram of a portion of a circuit showing the connections adjusted for a 220 volt current.

In these drawings I have illustrated one embodiment of my invention but it will be understood that this has been chosen for the purposes of illustration only and that the mechanism may take various forms without departing from the spirit of the invention.

When an electric motor is to be operated in the presence of explosive gases, as for example in a gasoline pump, it is customary to enclose the motor windings in a sealed casing and also to enclose the motor controlling switch in a sealed casing. Preferably, but not necessarily, the switch is mounted within the motor casing. In the present drawings, I have illustrated at 15 the end portion of a sealed motor casing which is provided with a bearing 16 for the shaft 17 of the armature 18. The upper portion of the casing is enlarged, as shown at 19, to provide space for the switch 20, which may be of any suitable type. Preferably the switch is of the snap action type but inasmuch as it forms no part of the invention it is not necessary to describe the same except to note that the contact members are operated by a spring 21 which is so connected with a switch arm 22 that as that arm approaches the limit of its movement in either direction the spring will be moved across the axis of the arm and released to snap the switch from one position to another. The spring offers but little resistance to the initial movement of the switch arm but that resistance increases as the arm moves and the spring is placed under tension, the greatest resistance being offered to the movement of the arm just before the spring crosses the axis of the arm and snaps the switch.

The switch is operated by means of an operating mechanism which is arranged partially within the casing and partially outside of the same. Due to the sealed character of the motor casing and the lack of ventilation motors of this type are especially liable to overheating, which may result in the burning out of the motor. I have therefore embodied in the operating mechanism a temperature controlled device which will operate automatically to open the switch upon the occurrence of abnormal temperature conditions within the motor casing and will prevent the switch from again being closed until the temperature within the casing has returned to normal. In the present construction the operating mechanism comprises a tubular shaft 23 which is journaled in and extends beyond both ends of a bearing 24 in a wall of the casing, in the present instance in the end wall adjacent to the switch chamber. Rotatably mounted in the tubular shaft 23 is a second or inner shaft 25 which extends beyond both ends of the tubular shaft. The inner shaft 25 is operatively connected with the switch and for that purpose has secured thereto an actuating member 26 which is here shown in the form of a lever rigidly secured to the inner end of the shaft 25 and having at its free end spaced lugs 27 which embrace the free end of the switch arm 22. Preferably the switch arm is provided with an anti-friction roller 28 which contacts with the lugs.

Suitable means are provided for so connecting the shafts 23 and 25 that they will normally rotate in unison but which will permit the same to be disconnected so that the inner shaft and its actuating lever may move with relation to the tubular shaft. This connecting means is automatically controlled so that the two shafts will be disconnected upon the occurrence of abnormal temperature conditions within the casing. In the construction here illustrated the connection is controlled by a thermostatic element which forms a part of the connecting device and which preferably consists of one or more bimetallic bars 29 which are connected with the tubular shaft 23 for rotation therewith. Connected with the bimetallic bars 29 is a latching device which, in the present instance, comprises a plate 30 having a latching member or arm 31 arranged adjacent to the switch actuating lever 26, when the parts are in their normal positions, and adapted to engage a stud 32 carried by the actuating lever. The end portion of the latching member, as shown at 33, may be bent towards the actuating lever to provide an inclined surface which will force the latch back and permit it to ride over the end of the stud when the parts are moved to their connected positions, and will then spring into the path of the stud. The stud is so mounted on the actuating lever that it may be adjusted toward and from the latching member to vary the movement which must be imparted to the latching member by the thermostatic element in order to release the actuating lever. The latching plate 30, as here shown, is provided with a second latching member 34, the end of which is spaced from the end of the latching member 31 so that the stud may extend between the same. This second latch member is inoperative in the normal operation of the device and is provided only for the purpose of permitting the direction of operation of the device to be reversed.

The thermostatic elements or bars 29 may be connected with the tubular shaft in any suitable manner but the temperature outside of the casing and the temperature of the casing itself usually differ substantially from the temperature within the casing and if the thermostatic element is connected directly with the casing, or with the tubular shaft 23, more or less of the heat which is received by the thermostatic element will be transmitted to the casing and dissipated in the outer atmosphere, and consequently this thermostatic element will not respond accurately to the temperatures within the casing. To prevent the dissipation of the heat from the thermostatic element and thus cause the same to accurately respond to the temperatures within the casing I have interposed between the bimetallic bars and the tubular shaft, and the casing, a supporting member of material having a low heat conductivity. In the present instance the support is formed of steel which has much less heat conductivity than has the brass of which the bimetallic bars are largely formed. This supporting member is shown at 35 as of a T-shape and is rigidly mounted on the inner end of the tubular shaft 23 and abuts against the end of the bearing 24. The transverse arms of the T-shaped support are arranged above the shaft and the bimetallic bars 29 are rigidly secured to these arms and extend downwardly on opposite sides of the tubular shaft, the latch plate being secured to the lower ends of the bars below the shaft.

The switch actuating lever 26 is acted upon by a suitable spring device which holds the stud 32 against the end 33 of the latch and causes the two shafts and the parts carried thereby to rotate in unison in the normal operation of the switch. When the latch is actuated by the thermostatic element to release the switch actuating lever this same spring means moves that lever and its shaft 25 with relation to the shaft 23 and in a direction to open the switch. When the tubular shaft is actuated to open the switch the latch will move with the shaft and the spring acting upon the switch actuating lever will hold the stud 32 in engagement with the latch and cause the switch actuating member to move therewith, these positions being shown in Fig. 4 of the drawings. When the tubular shaft is moved in the other direction, to close the switch the latch will engage the stud 32 and positively move the switch actuating lever to the position shown in Fig. 5. If the latch is actuated by the thermostat while the switch is in its closed position, as shown in Fig. 5, the switch actuating lever will be released and will be moved by its spring to the position shown in Fig. 6. The movement of the switch actuating lever is limited by the switch arm 22 and the movement of this arm is positively so limited by the switch itself that the stud will not move out of engagement with the latch plate. Therefore, by rotating the tubular shaft in the direction required to open the switch the latch member will be caused to ride over and again operatively engage the stud, thereby reestablishing the connection between the two shafts but this connection cannot be reestablished until the temperature within the casing has been reduced substantially to normal so that the thermostatic element may restore the latch to its normal position.

The spring device which acts on the switch actuating lever may be of any suitable character but it is preferably connected with the inner shaft 25 on the outside of the casing. When a spring is placed under tension and then released it has its greatest power during its initial expansion and this power gradually diminishes as the spring expands. When such a spring is utilized for operating the switch arm 22 it will exert the greatest force on that arm when the switch spring is offering the least resistance to the arm and will apply the least force to the arm at the time when the resistance to the movement of the arm is greatest. Therefore it requires a heavy spring to insure the proper operation of the switch when the switch actuating member is released for movement. In the present mechanism I have provided a spring device which will act upon the switch with an increasing force, so that the greatest force will be applied to the switch arm when the greatest resistance is offered to the movement of the switch arm. This spring device is shown in detail in Figs. 7 to 10. For the purpose of operating the tubular shaft 23 in the normal operation of the switch I have rigidly secured to the outer end of that shaft an operating member or plate 36 which may be manually actuated by a handle 37 secured thereto or may be connected with an operating device mounted at a remote point. This operating plate is provided with an arcuate slot 38 through which extends a pin 39, mounted in the end of the bearing 24, which pin serves to limit the movement of the plate and of the tubular shaft. I have utilized this plate as a part of the spring device which is interposed between the two shafts for the purpose of actuating the inner shaft and the switch actuating lever. For this purpose I have mounted on the plate 36 two studs 40 which extend lengthwise of the shaft and are spaced radially from the axis thereof. Rigidly secured to the inner shaft 25, between the studs 40, is a connecting member 41 here shown as a relatively thick plate of a width much less than the width of the plate 36. This connecting member is provided in its opposite sides with recesses 42. Springs 43 are mounted at their outer ends on the respective studs 40 and extend across and are on opposite sides of the connecting member 41. Each spring 43 has its inner portion curved about the adjacent portion of the connecting member in such a manner that the inner end thereof will be seated in the recess 42 in that side of the connecting member opposite the stud with which that spring is connected and will exert a rotative force on the connecting member and on the inner shaft. The point at which the end of the spring contacts with the connecting member is located adjacent to a line extending through the axis of the connecting member and through the stud which supports the spring and on that side of the line opposite the body of the spring. Consequently the spring exerts rotative force on the connecting member along a line which, when the parts are in their normal positions, extend close to the axis of the connecting member but which moves away from that axis as the connecting member is rotated by the spring, thus in effect increasing the leverage exerted by the connecting member on the shaft and increasing the force applied to the shaft an amount greater than the decrease in the force of the spring itself, and causing the device to exert its maximum force upon the switch arm just before that arm completes its movement and at a time when the switch spring is under greatest tension. The springs 43 are placed under tension when the parts are moved to their normal positions and the parts of the spring device have no relative movement in the normal operation of the switch but this device serves to hold the stud 32 of the switch actuating lever in engagement with the latch member which is connected with the tubular shaft and consequently both shafts and the several parts connected therewith move in unison when the switch is operated in the usual manner. This will be apparent from an inspection of Figs. 7 and 8 where the several parts of the connecting device are shown in the same positions but the plate 36 has been rotated to cause the switch to be moved from one position to another. In Fig. 9 the parts are shown in the positions which they assume when the switch actuating lever is released. It will be noted that the operating plate 36 is in its "on" position, corresponding with the position of the latch member in Figs. 5 and 7, but that the connecting member 41 has been rotated by the springs 43 to move the switch actuating lever to the position shown in Fig. 6.

When the operating plate 36 is moved from its "on" to its "off" position, that is, from the position shown in Fig. 8 to the position shown in Fig. 7, the springs 43 constitute a connection between the two shafts which causes the inner shaft to rotate with the outer shaft. Ordinarily the springs will provide a satisfactory connection but in order to avoid a strain on the springs or the displacing of the same, I prefer to provide a device which will establish a positive connection between the plate 36 and the inner shaft 25 when the plate is moved to its "off" position but which will leave the inner shaft free to rotate to its open position when the plate is in its "on" position. For this purpose I have rigidly secured to the end of the shaft 25, and on the outer side of the connecting member 41, a plate 44 having parts or arms 45 arranged to be engaged by the respective studs 40 when the plate 36 is moved toward its "off" position, thus establishing a positive connection between that plate and the shaft but permitting the plate to move away from the studs when the inner shaft is rotated toward its open position with relation to the plate 36. This plate 44 also serves to prevent the lateral displacement of the springs and provides a guard therefor.

Motors of this type are usually operable upon a current of either 110 volts or 220 volts but in order to change from one voltage to another it is necessary to gain access to the interior of the casing and change the leads from the field windings and I have provided the present motor with means whereby the connections can be quickly and easily changed from the exterior of the casing. For this purpose I have provided the casing with an opening 46, which, in the present instance, is located below the armature shaft. Mounted in the inner end of this opening is a terminal block 47, preferably of insulating material, and this terminal block is provided with three terminals, here shown as binding posts 48, 49 and 50 which are on the outer face of the terminal block and are readily accessible from the exterior of the casing. The terminals 48 and 49 are connected on the inner side of the block with conductors 51 which lead to the switch 20. The motor is provided with conductors 52 and 53 which lead from field windings 54 and 55, which windings are connected one to the other and to the terminal block, and with conductors 56 and 57 which lead from field windings 58 and 59, which windings are connected one to the other, to the terminal block. The terminal block is provided with an opening 60 through which the conductors for the field windings may be extended, thereby enabling the same to be connected with the desired terminals on the outer side of the block. In Fig. 12 the conductors 52 and 57 are connected with the terminal 48 and the conductors 53 and 56 are connected with the terminal 49, thus providing the connections for 110 volt current. In this arrangement the terminal 50 is idle. In Fig. 13 I have shown the conductor 57 connected with the terminal 48 and the conductor 53 connected with the terminal 49, while the conductors 52 and 56 are connected with the terminal 50 which serves to connect the same one to the other, thereby providing the necessary connections for a 220 volt current. A closure 61 is tightly fitted to the outer end of the opening 46 and is here shown as a hollow plug screw threaded into the opening so as to provide an explosion resisting closure.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mechanism for operating a switch within a closed casing, an actuating device operatively connected with a switch, means to control the operation of said actuating device including a thermostatic element arranged within said casing, and a support for said thermostatic element movably mounted on said casing within the same and having relatively low heat conductivity.

2. In a mechanism for operating a switch within a closed casing, an actuating device mounted within said casing separately from the switch and having operative connection with the switch, a shaft mounted in a wall of said casing, means for rotating said shaft, and means for normally connecting said shaft with said actuating device including a thermostatic element and a supporting member secured to said shaft and to said thermostatic element and having low heat conductivity.

3. In a mechanism for operating a switch within a closed casing, an actuating device mounted in said casing separate from the switch and having operative connection with the switch, a supporting member mounted in said casing for movement with relation to said switch, a thermostatic bar carried by said supporting member, said supporting member having less heat conductivity than said thermostatic bar, a latch carried by said thermostatic bar to connect said supporting member with said actuating device, and means arranged exteriorly of said casing for imparting movement to said supporting member.

4. In a mechanism for operating a switch within a closed casing, an actuating device mounted in said casing separate from said switch and having operative connection with said switch, a shaft mounted in the wall of said casing, means for rotating said shaft, a supporting member secured to said shaft for movement therewith with relation to said switch, a thermostatic bar carried by said supporting member, said supporting member having less heat conductivity than said thermostatic bar, and a latch carried by said thermostatic bar to connect said shaft with said actuating device.

5. In a mechanism for operating a switch within a closed casing, an actuating device mounted in said casing separate from said switch and having operative connection with said switch, a shaft mounted in the wall of said casing, means for rotating said shaft, a supporting member secured to said shaft and having parts extending laterally beyond the respective sides of said shaft, thermostatic bars secured to the respective lateral portions of said member, and a latch carried by said thermostatic bars to connect said shaft with said actuating device.

6. In a mechanism for operating a switch within a closed casing, an actuating device mounted within said casing separate from said switch and having operative connection with said casing, a shaft mounted in the wall of said casing, a supporting member secured to said shaft and having parts extending laterally beyond the respective sides of said shaft, thermostatic bars secured to the respective lateral portions of said member, and a plate carried by said thermostatic bars and having a part forming a latch and movable into and out of operative relation to said actuating device by the action of said thermostatic bars.

7. In a mechanism for operating a switch within a closed casing, an operating device mounted exteriorly of said casing, a switch actuating device mounted within said casing separate from said switch and having operative connection with the switch, and means for normally connecting said operating device with said switch actuating device, comprising a thermostatic element and a movable support for said thermostatic element connected with said operating device and having relatively low heat conductivity.

8. In a mechanism for operating a switch within a closed casing, a tubular shaft mounted in a wall of said casing, a second shaft mounted in said tubular shaft, an operating device connected with the outer end of said tubular shaft, spring means for connecting said operating device with the outer end of said second shaft, an actuating device secured to the inner end of said second shaft and having operative connection with the switch, a supporting member of low heat conductivity secured to the inner end of said tubular shaft, a thermostatic bar carried by said supporting member, and a part secured to said thermostatic bar for connecting the same with said actuating device.

9. A switch operating mechanism comprising a shaft, means for rotating said shaft, a second shaft rotatable about an axis coincident with the axis of the first mentioned shaft, means for connecting said second shaft with a switch, releasable means for normally connecting said second shaft with the first mentioned shaft for rotation therewith, and spring means interposed between said shafts to move said second shaft with relation to said first mentioned shaft when it is released therefrom, said spring means being arranged to exert increasing force on said second shaft as the latter moves from its initial position.

10. A switch operating mechanism comprising a shaft, means for rotating said shaft, a second shaft rotatable about an axis coincident with the axis of the first mentioned shaft, means for connecting said second shaft with a switch, releasable means for normally connecting said second shaft with the first mentioned shaft for rotation therewith, and spring means interposed between said shafts to move said second shaft with relation to said first mentioned shaft when it is released therefrom, said spring means comprising a part secured to said second shaft and also comprising a spring connected with said first mentioned shaft and acting on said part to rotate said second shaft, said spring and said part being so arranged that the effective leverage of said part on said second shaft will increase as said part rotates.

11. A switch operating mechanism comprising a shaft, means for rotating said shaft, a second shaft rotatable about an axis coincident with the axis of the first mentioned shaft, means for connecting said second shaft with a switch, releasable means for normally connecting said second shaft with the first mentioned shaft for rotation therewith, a connecting member secured to said second shaft, a plate secured to said first mentioned shaft, a stud carried by said plate and extending across said connecting member and spaced therefrom, a spring connected at one end with said stud and having its end portion curved about said connecting member and engaging the same at a point spaced from the axis thereof and adjacent to a line extending through the axis of said member and through said stud, whereby when said second shaft is released from said first mentioned shaft said spring will rotate said member and said second shaft and the point of engagement between said spring and said connecting member will move away from said line as said member rotates.

12. A switch operating mechanism comprising a shaft, means for rotating said shaft, a second shaft rotatable about an axis coincident with the axis of the first mentioned shaft, means for connecting said second shaft with a switch, releasable means for normally connecting said second shaft with the first mentioned shaft for rotation therewith, a connecting member secured to said second shaft, a plate secured to said first mentioned shaft, a stud carried by said plate and extending across said connecting member and spaced therefrom, a spring connected at one end with said stud and having its end portion curved about said connecting member and engaging the same at a point spaced from the axis thereof and adjacent to a line extending through the axis of said member and through said stud, whereby when said second shaft is released from said first mentioned shaft said spring will rotate said member and said second shaft and the point of engagement between said spring and said connecting member will move away from said line as said member rotates, and an arm rigidly secured to said second shaft and arranged to engage said stud and positively connect said shafts when said first mentioned shaft is rotated in one direction.

13. A switch operating mechanism comprising a tubular shaft, a second shaft mounted in said tubular shaft, means for connecting said second shaft with a switch, temperature controlled means for normally holding said second shaft against rotation with relation to said tubular shaft, a plate secured to said tubular shaft, studs projecting from said plate on opposite sides of said tubular shaft, a member secured to said second shaft between said studs, and springs connected at their outer ends with the respective studs and arranged on opposite sides of said member, each of said springs being curved about the adjacent portion of said member to cause its inner end to engage said member on that side thereof opposite the stud with which that spring is connected and to exert rotative effort thereon at a point slightly beyond a line extending through the axis of said member and through said stud and which will move away from said line as said member is rotated by said spring.

14. A switch operating mechanism comprising a tubular shaft, a second shaft mounted in said tubular shaft, means for connecting said second shaft with a switch, temperature controlled means for normally holding said second shaft against rotation with relation to said tubular shaft, a plate secured to said tubular shaft, studs projecting from said plate on opposite sides of said tubular shaft, a member secured to said second shaft between said studs, and springs connected at their outer ends with the respective studs and arranged on opposite sides of said member, each of said springs being curved about the adjacent portion of said member to cause its inner end to engage said member on that side thereof opposite the stud with which that spring is connected and to exert rotative effort thereon at a point slightly beyond a line extending through the axis of said member and through said stud and which will move away from said line as said member is rotated by said spring, and a plate rigidly secured to said second shaft and having parts arranged to engage said studs and positively connect said shafts when said plate is rotated in one direction.

15. In a mechanism comprising a rotatable member and releasable means to hold said member normally against rotation, a spring acting on said member to exert rotative effort thereon along a line that is adjacent to the axis of said member when the latter is in its normal position and which moves away from said axis as said member is rotated by said spring.

16. In a mechanism comprising a rotatable member and releasable means to hold said member normally against rotation, a spring connected at one end with a normally stationary support at a point spaced from the axis of said rotatable member and connected at its other end with said member on that side of said axis opposite its point of connection with said support and at a point adjacent to a line extending through said axis and through the point of connection of said spring with said support, whereby as said member is rotated by said spring its point of connection with said spring will move away from said line.

17. In a mechanism comprising two members rotatable about a common axis and held normally against rotation with relation one to the other, means for releasing one of said members for rotation with relation to the other member, and a spring connected with said members at points spaced from said common axis, the point of connection of said spring with the released member being so arranged that said spring will exert increasing rotative effort on said member as the latter rotates.

18. In a mechanism comprising members rotatable about a common axis and held normally against rotation with relation one to the other, a spring having one end connected with one of said members at a point spaced from said common axis and having its other end curved about said common axis and acting on the other member to exert rotative force thereon at a point adjacent to a line extending through said common axis and the first mentioned end of said spring and so arranged that the point at which said force is exerted will move away from said line as said member is rotated by said spring, and means for releasing the last mentioned member for rotation by said spring.

19. In a mechanism comprising a tubular shaft and a second shaft mounted in said tubular shaft, releasable means to hold said shafts normally against rotation with relation one to the other, laterally extending members secured to the respective shafts, a spring secured at one end to one of said members on one side of the axis thereof and having its other end portion curved about said axis and engaging the other member on the other side of said axis, said parts being so arranged that said spring will exert a rotative force on the last mentioned member along a line which is adjacent to said axis when said last mentioned member is in its initial position and which will move away from said axis as said last mentioned member is rotated by said spring.

20. In a mechanism comprising a tubular shaft and a second shaft mounted in said tubular shaft and projecting beyond one end thereof, releasable means to hold said shafts against rotation with relation one to the other, a plate secured to said tubular shaft, a member of less width than said plate secured to said second shaft, studs secured to said plate on opposite sides of said shafts, extending across and spaced radially from said member, and springs secured to the respective studs and extending on opposite sides of said member, each spring having its end portion curved about said member to engage that edge of said member opposite the stud to which that spring is secured and to exert rotative force on said member at a point adjacent to a line extending through the axis of said member and through said stud, which point will move away from said line as said member is rotated by said springs.

21. A switch operating mechanism comprising an actuating device having means for connecting the same with a switch, an operating device, releasable means for normally connecting said actuating device with said operating device for operation thereby, and spring means connected with said actuating device to move the same with relation to said operating device when it is released therefrom, said spring means being arranged to exert increasing force on said actuating device as the latter moves from its initial position.

22. A switch operating mechanism comprising an actuating device having means for connecting the same with a switch, an operating device, releasable means for normally connecting said actuating device with said operating device for operation thereby, and spring means interposed between and connected with said devices to move said actuating device with relation to said operating device when it is released therefrom, said spring means being arranged to exert increasing pressure on said actuating device as the latter moves from its initial position.

23. A switch operating mechanism comprising a rotatable member, means for rotating said member, a second rotatable member, means for operatively connecting said second member with a switch, releasable means to connect said second member with the first mentioned member for rotation thereby, and spring means acting on said second member to rotate the same with relation to said first mentioned member when it is released therefrom, said spring means being arranged to exert increasing force on said second member as the latter moves from its initial position.

24. A switch operating mechanism comprising a rotatable member, means for rotating said member, a second rotatable member, means for operatively connecting said second member with a switch, releasable means to connect said second member with the first mentioned member for rotation thereby, and a spring connected with said second member to rotate the same with relation to the first mentioned member when it is released therefrom, said spring being connected with said second member at a point spaced from the axis thereof and being so arranged that the line of thrust of said spring will be spaced increasing distances from said axis as said second member is rotated by said spring.

GEORGE H. LELAND.